United States Patent [19]
Kimura et al.

[11] Patent Number: 5,493,555
[45] Date of Patent: Feb. 20, 1996

[54] OPTICAL HEAD USING BIREFRINGENT DIFFRACTION GRATING

[75] Inventors: Yasuo Kimura; Yuzo Ono, both of Tokyo, Japan

[73] Assignee: NEC Corporation, Tokyo, Japan

[21] Appl. No.: 469,787

[22] Filed: Jun. 6, 1995

Related U.S. Application Data

[63] Continuation of Ser. No. 208,788, Mar. 11, 1994, abandoned, which is a continuation of Ser. No. 543,510, May 26, 1990, abandoned.

[30] Foreign Application Priority Data

Jun. 26, 1989 [JP] Japan ..................... 1-164227
Jun. 26, 1989 [JP] Japan ..................... 1-164228

[51] Int. Cl.$^6$ ............................................. G11B 7/00
[52] U.S. Cl. ...................... 369/110; 369/109; 369/112
[58] Field of Search .............................. 369/110, 109, 369/44.23, 13, 112, 44.12; 385/37; 359/494, 566

[56] References Cited

U.S. PATENT DOCUMENTS

| | | | |
|---|---|---|---|
| 4,858,218 | 8/1989 | Takagi et al. ..................... | 369/109 |
| 4,885,734 | 12/1989 | Yuzo ..................... | 369/112 |
| 4,894,815 | 1/1990 | Yamanaka ..................... | 369/13 |
| 4,918,675 | 4/1990 | Lee ..................... | 369/13 |
| 4,933,924 | 6/1990 | Yonekubo ..................... | 369/44.11 |
| 4,953,124 | 8/1990 | Koyama ..................... | 369/110 |
| 4,989,189 | 1/1991 | Sander et al. ..................... | 369/13 |

FOREIGN PATENT DOCUMENTS

| | | |
|---|---|---|
| 0253403 | 1/1988 | European Pat. Off. . |
| 0264285 | 4/1988 | European Pat. Off. . |
| 0273356 | 7/1988 | European Pat. Off. . |
| 8706386 | 10/1987 | France . |
| 63-314502 | 12/1988 | Japan . |

Primary Examiner—Georgia Y. Epps
Assistant Examiner—P. W. Huber
Attorney, Agent, or Firm—Sughrue, Mion, Zinn, Macpeak & Seas

[57] ABSTRACT

A light radiated from a light source is focused on an optical disc by a focusing lens. A light reflected from the optical disc is introduced to a signal detection system. In the signal detection system, the introduced light is diffracted by a birefringent diffraction grating element utilizing an optical crystal. The diffracted light is received by a photodetector. Consequently, focus and track errors are detected, and information stored in the optical disc is re-produced.

14 Claims, 15 Drawing Sheets

- 29 PHOTODETECTOR
- 28a BIREFRINGENT DIFFRACTION GRATING ELEMENT
- 27 SEMICONDUCTOR LASER
- 30 PHOTODETECTOR
- 28b BIREFRINGENT DIFFRACTION GRATING ELEMENT
- 31 FOCUSING LENS
- 18 MAGNETOOPTIC DISC

- 34 FILLING MATERIAL
- 33 OPTIC AXIS
- 32 ANISOTROPIC PLATE
- 32A GRATING GROOVE

OPTICAL HEAD USING BIREFRINGENT DIFFRACTION GRATING

This is a Continuation of application Ser. No. 08/208,788, filed Mar. 11, 1994, now abandoned which is a Continuation of application Ser. No. 07/543,510 filed Jun. 26, 1990, now abandoned.

FIELD OF THE INVENTION

This invention relates to an optical head, and more particularly to, an optical head used for erasable magnetooptic disc and phase-change optical disc, a write-once optical disc, a read-only optical disc, etc.

BACKGROUND OF THE INVENTION

An optical head which is applied to an optical recording apparatus utilizing an optical disc is required to have functions of detecting a focus error to form a minute light spot on the optical disc and a track error to precisely trace a predetermined track on the optical disc. Further, the optical head is required to have a function of detecting an intensity of a light reflected from the optical disc to reproduce information stored in the optical disc, where the optical disc is a read-only optical disc, a write-once optical disc, or a phase-change optical disc.

In one type of a conventional optical head, a light reflected from an optical disc is partly introduced to a signal detecting system by a polarizing beam splitter, and is divided into a focus error detecting light and a track error detecting light in the signal detecting system by a beam splitter. Then, a focus error is detected in the knife edge method by receiving the focus error detecting light, and a track error is detected in the push-pull method by receiving the track error detecting light.

In a further type of a conventional optical head, a light reflected from a magnetooptic disc is partly introduced to first and second signal detecting systems by first and second polarizing beam splitters arranged in tandem on a light path. In the first signal detecting system, the introduced light is divided into first and second lights by a beam splitters, so that information stored in the optical disc is re-produced by a difference of light intensity between the first and second divided lights. In the second signal detecting system, the introduced light is also divided into third and fourth lights by a beam splitters, so that a focus error is detected in the knife edge method by receiving the third divided light, and a track error is detected in the push-pull method by receiving the fourth divided light.

In a still further type of a conventional optical head, a light reflected from a magnetooptic disc is divided into first and second diffraction lights by first and second birefringent diffraction grating elements having specified light axes and predetermined filling materials and arranged in tandem on a light path, so that information stored in the magnetooptic disc is re-produced by a difference of light intensity between the first and second diffraction lights.

According to the conventional optical heads, however, there is a disadvantage in that it is difficult that the optical heads become light and compact, because a number of parts such as a polarizing beam splitter, a half wave plate, a quarter wave plate, etc. are arranged in a predetermined designed pattern as explained in detail later. There is a further disadvantage in that it is difficult that the optical heads are decreased in cost and price, because the number of parts is large, the polarizing beam splitter is high in price, and the number of assembling steps is large as also explained later. There is a still further disadvantage in that a light utilizing factor is decreased especially in the optical head having the magnetooptic disc, because the first and second diffraction lights exist partly on a single light path, through which a light radiated from a light source is propagated in a direction to the magnetooptic disc.

SUMMARY OF THE INVENTION

Accordingly, it is an object of this invention to provide an optical head which becomes light and compact.

It is a further object of this invention to provide an optical head which becomes low in cost and price.

It is a still further object of this invention to provide an optical head having a high utilizing factor of light.

According to this invention, an optical head comprises:

means for focusing a light radiated from a light source on an optical disc;

an optical diffraction element for diffracting a light reflected from the optical disc; and a photodetector device for detecting a light diffracted by the optical diffraction element;

wherein the optical diffraction element is a birefringent diffraction grating element utilizing an optical crystal.

BRIEF DESCRIPTION OF THE DRAWINGS

This invention will be explained in more detail in conjunction with appended drawings, wherein.

DESCRIPTION OF THE PREFERRED EMBODIMENTS

Before explaining an optical head in the preferred embodiments according to the invention, the aforementioned conventional optical heads will be explained in more detail.

Figure 1:
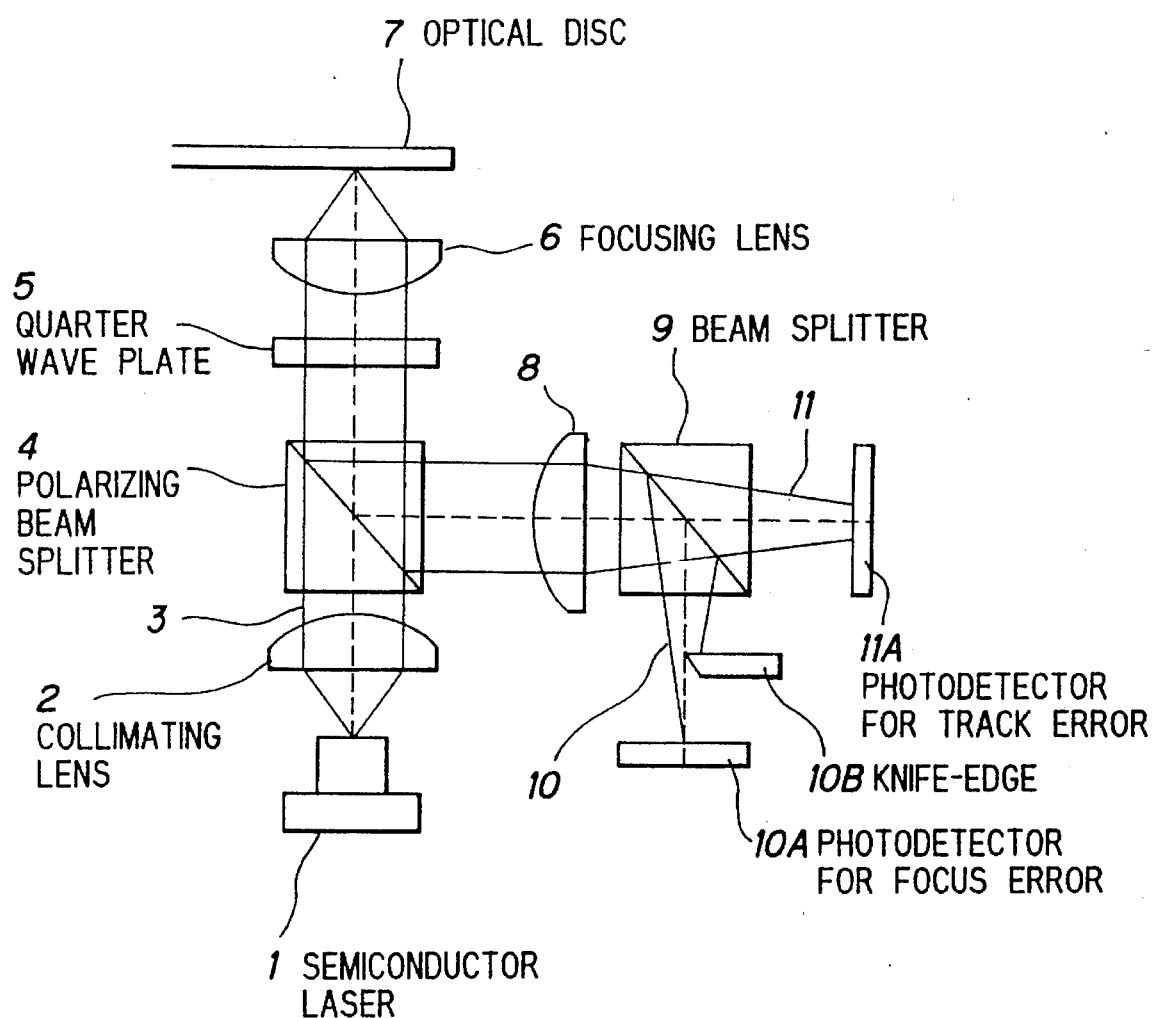
FIGS. 1 to 3 are explanatory diagrams showing conventional optical heads.

FIG. 1 shows the first type of the conventional optical head comprising a semiconductor laser 1, a polarizing beam splitter 4, a quarter wave plate 5, an optical disc 7, a beam splitter 9, etc.

In this optical head, a linearly polarized light radiated from the semiconductor laser 1 is converted to a parallel light 3 to be supplied to the polarizing beam splitter 4 by a collimating lens 2. A polarized direction of the parallel light 3 is set to transmit through the polarizing beam splitter 4. The light transmitted through the polarizing beam splitter 4 is transmitted through the quarter wave plate 5 to be focused on the optical disc 7 by a focusing lens 6. A light reflected from the optical disc 7 is transmitted through the quarter wave plate 5 back to the polarizing beam splitter 4 as a linearly polarized light orthogonal in polarization to the radiated light of the semiconductor laser 1. The light incident to the polarizing beam splitter 4 is bent in its light path by 90 degrees, so that it is introduced to a signal detecting system. This introduced light is divided into a light 10 for detecting a focus error and a light 11 for detecting a track error by the beam splitter 9. Then, the focus error is detected in the knife edge method using a knife edge 10B by a photodetector 10A receiving the light 10, while the track error is detected in the push-pull method by a photodetector 11A receiving the light 11. In addition, information stored in the optical disc 7 is re-produced by a sum of outputs of the optical detectors 10A and 11A.

In an erasable magnetooptic disc, on the other hand, information is re-produced by detecting a rotating direction of a linearly polarized light incident to the disc. Therefore, it is required that a rotation of a polarizing direction is precisely detected, even if it is a minute rotation.

Figure 2:
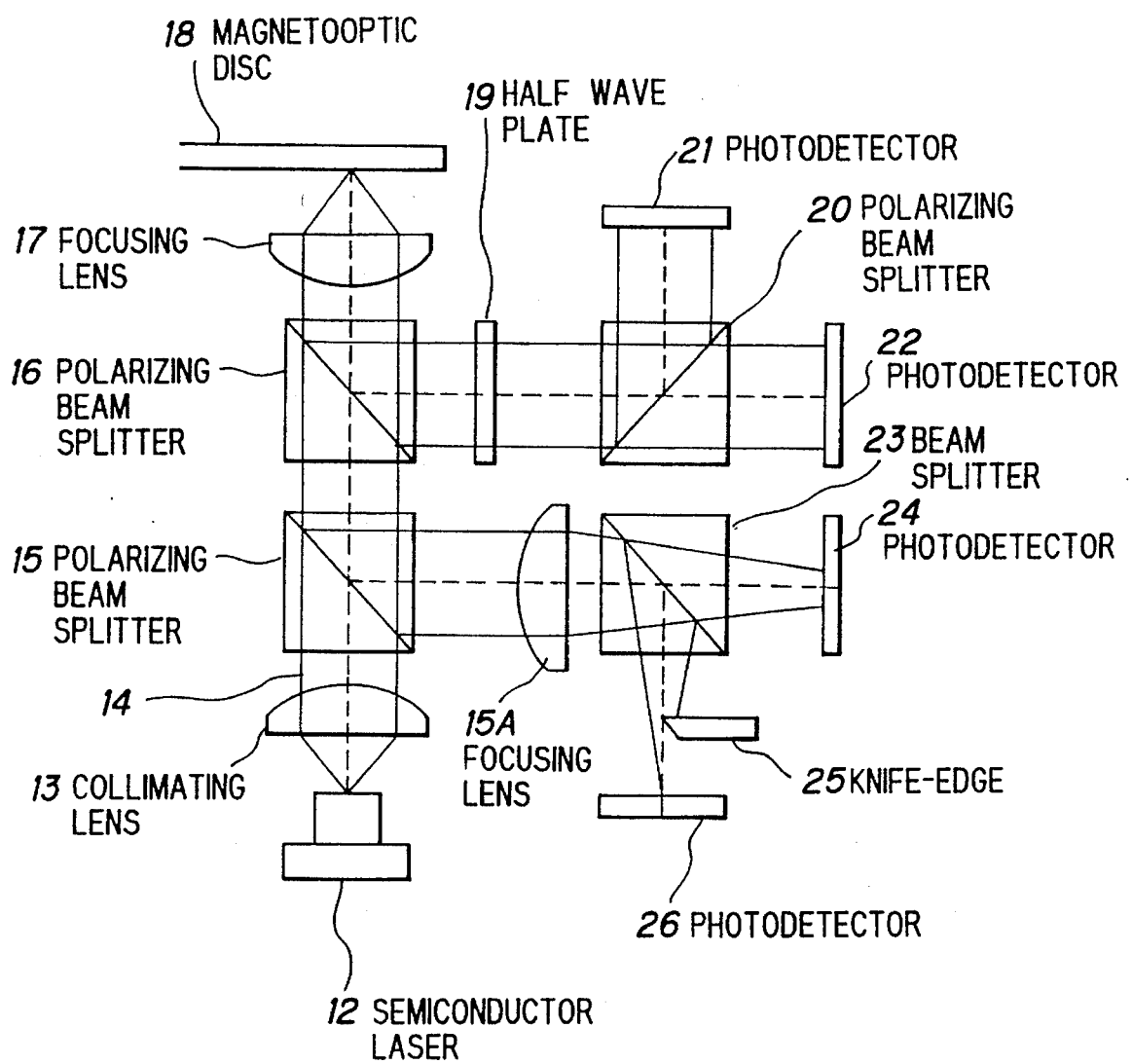

FIG. 2 shows the second type of the conventional optical head comprising a semiconductor laser 12, first and second polarizing beam splitters 15 and 16, a magnetooptic disc 18, a half wave plate 19, a third polarizing beam splitter 20, a beam splitter 23, etc.

In this optical head, a light radiated from the semiconductor laser 12 is converted to a parallel light 14 by a collimating lens 13, and the parallel light 14 is transmitted through the first and second polarizing beam splitters 15 and 16 to be focused on the magnetooptic disc 18 by a focusing lens 17. A light reflected from the magnetooptic disc 18 is introduced to first and second signal detecting systems by the first and second polarizing beam splitters 15 and 16. The introduced light of the second polarizing beam splitter 16 is rotated in its main polarized direction by 45 degrees, when it is transmitted through the half wave plate 19. Then, the light is supplied to the third polarizing beam splitter 20, so that the light is divided into a first light to be supplied to a first photodetector 21 and a second light to be supplied to a second photodetector 22. Then, information stored in the magnetooptic disc 18 is re-produced by a subtraction of outputs of the first and second photodetectors 22 and 24. The reason why the first and second lights divided by the polarizing beam splitter 20 are received by the first and second photodetectors 22 and 24, after the 45 degree rotation of the polarized light is carried out by the half wave plate 19, is that a magnetooptic signal is improved in its quality by removing in-phase signal components in light intensity change of the reflected light, etc. The introduced light of the first polarizing beam splitters 15 is transmitted through a focusing lens 15A to be supplied to the beam splitter 23, so that the light is divided into a third light to be supplied to a third photodetector 24 and a fourth light partly to be interrupted by a knife edge 25 and supplied to a fourth photodetector 26. Thus, a track error is detected in the push-pull method by the third photodetector 24, and a focus error is detected in the knife edge method by the fourth photodetector 26.

Figure 3:
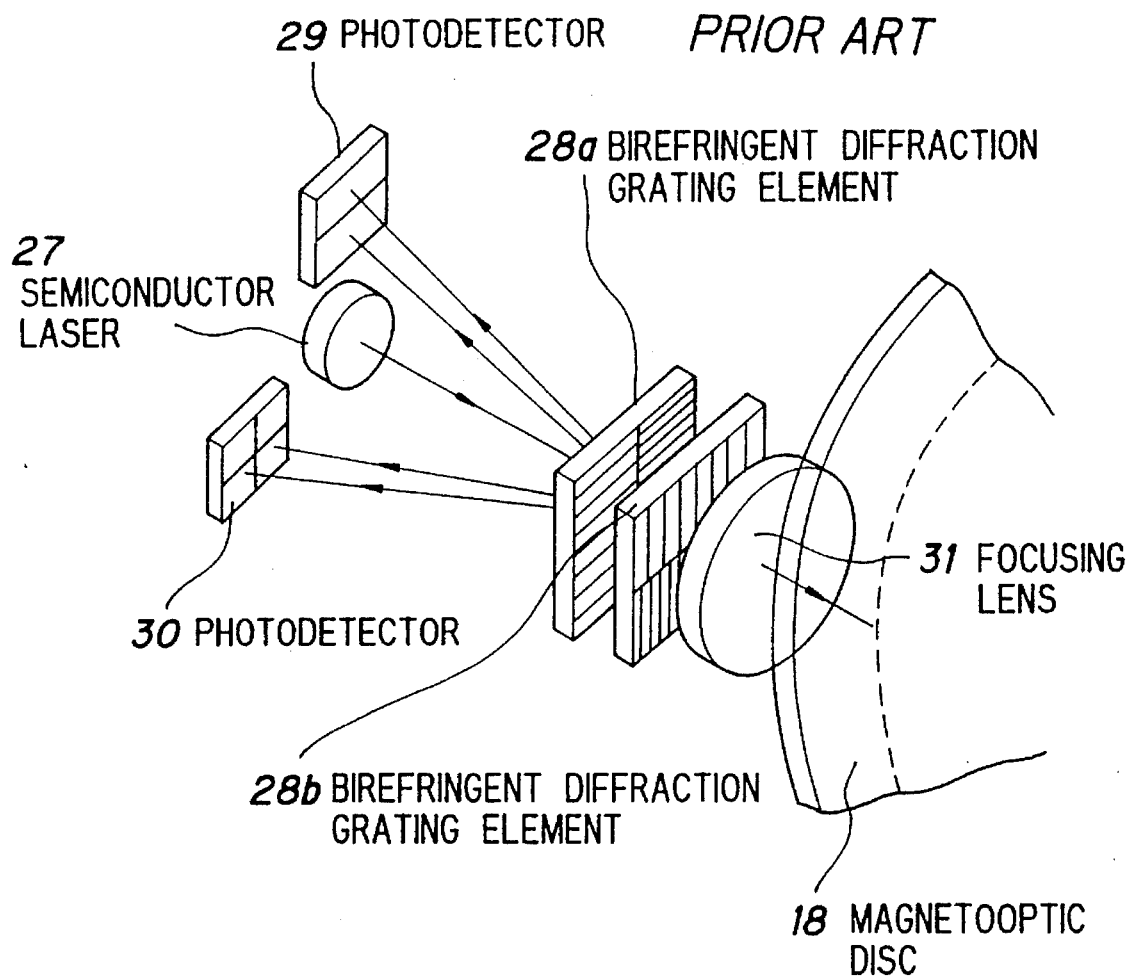
Figure 4:
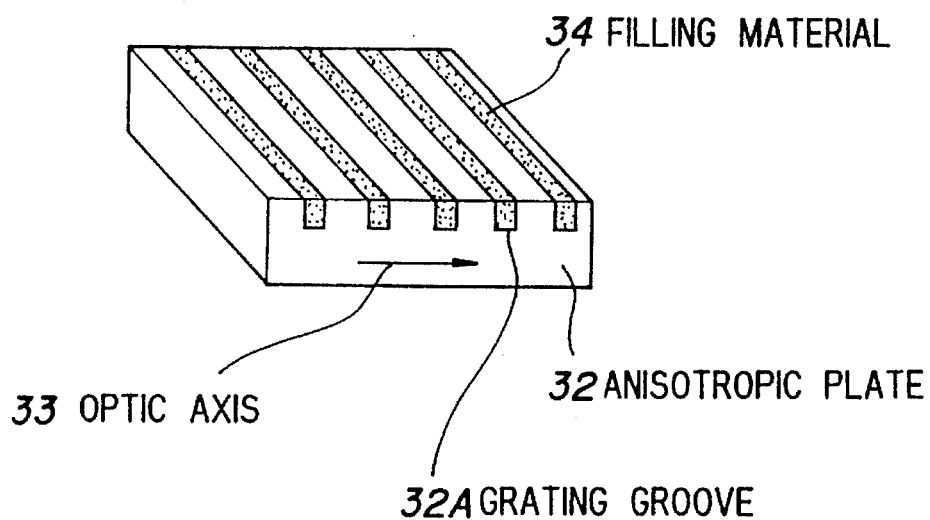
FIG. 4 is a schematic view showing a birefringent diffraction grating element used in the conventional optical head of FIG. 3.

FIG. 3 shows the third type of the conventional optical head utilizing birefringent diffraction grating-elements, for instance, as explained in the Japanese Patent Application No. 62-81571, and comprising a semiconductor laser 27, birefringent diffraction grating elements 28a and 28b, a magnetooptic disc 18, etc. The birefringent diffraction grating elements 28a and 28b have a function of diffracting a light having a particular polarized component, and a structure as shown in FIG. 4. That is, each of the birefringent diffraction grating elements 28a and 28b is composed of an anisotropic plate 32 having two different refractive indexes in directions orthogonal to an optic axis 33, and a material having a refractive index equal to one of the two refractive indexes and contained in grating grooves 32A provided on a surface of the anisotropic plate 32, and one of the birefringent diffraction grating elements 28a and 28b has grating grooves different in interval period from the other.

In this optical head, a light radiated from the semiconductor laser 27 is transmitted through the birefringent diffraction grating elements 28a and 28b to be focused on the magnetooptic disc 18 by a focusing lens 31. A light reflected from the magnetooptic disc 18 is diffracted to be supplied to a two divided photodetector 29 by the birefringent diffraction grating element 28a, so that a track error is detected in the push-pull method, while the reflected light is also diffracted to be supplied to a four divided photodetector 30 by the birefringent diffraction grating element 28b, so that a focus error is detected in the knife edge method. The birefringent diffraction grating elements 28a and 28b are designed, such that the optic axes 33 and the filling materials 34 are adequately selected to divide the reflected light into the two diffraction lights each having a different polarization from the other. Information stored in the magnetooptic disc 18 is re-produced by an intensity difference between the two diffraction lights, that is, a subtraction between a first sum of outputs of the two divided photodetector 29 and a second sum of outputs of the four divided photodetector 30.

Figure 5:
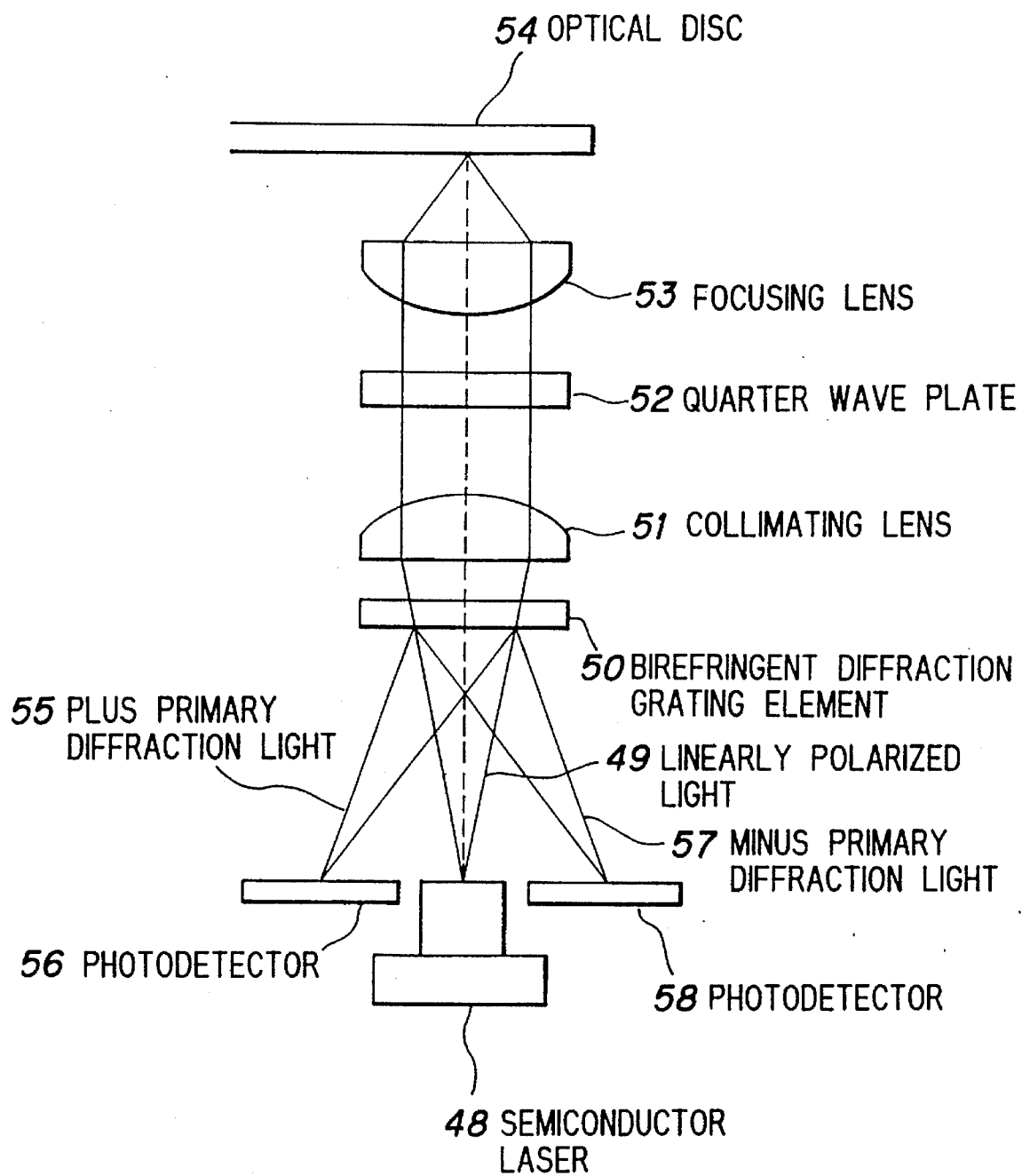
FIG. 5 is an explanatory diagram showing an optical head in a first preferred embodiment according to the invention.

Next, an optical head in the first preferred embodiment according to the invention will be explained in FIG. 5. The optical head comprises a semiconductor laser 48 for radiating a linearly polarized light 49, a birefringent diffraction grating element 50 (to be explained later in detail), a collimating lens 51, a quarter wave plate 52, a focusing lens 53, an optical disc 54, and first and second photodetectors 56 and 58.

In this optical head, the linearly polarized light 49 radiated from the semiconductor laser 48 is incident to the birefringent diffraction grating element 50 consisting of a lithium niobate crystal having a Z-axis orthogonal to the polarization of the light 49. The light 49 is not affected by the birefringent diffraction grating element 50, because the incident light 49 is an ordinary light relative to the birefringent diffraction grating element 50. A light transmitted through the birefringent diffraction grating element 50 is converted to a parallel light by the collimating lens 51, and is transmitted through the quarter wave plate 52 to be focused on the optical disc 54 by the focusing lens 53. A light reflected from the optical disc 54 is converted to a parallel light to be supplied to the quarter wave plate 52, in which a linearly polarized light orthogonal in polarization to the linearly polarized light 49 is obtained to be incident to the birefringent diffraction grating element 50, so that the incident light is diffracted due to the function of a grating pattern of the birefringent diffraction grating element 50, because the reflected light is an extraordinary light relative to the lithium niobate crystal. Then, a plus primary diffraction light 55 is received by the first photodetector 56, and a minus primary diffraction light 57 is received by the second photodetector 58. Thus, focus and track error signals are obtained by outputs of the first photodetector 56, and information stored in the optical disc 54 is re-produced by a sum of outputs of the first and second photodetectors 56 and 58.

Figure 6:
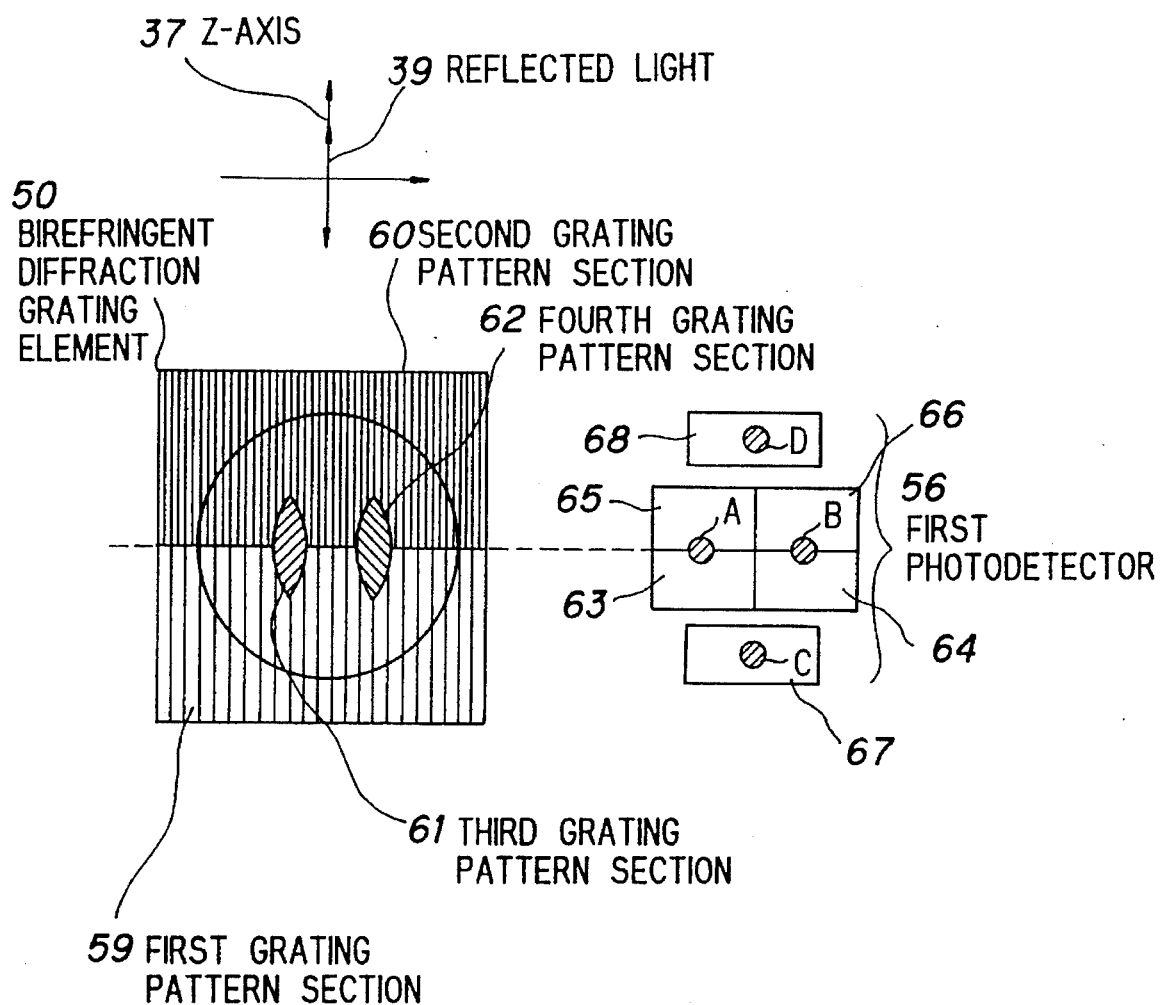
FIG. 6 is an explanatory diagram showing a relation between a birefringent diffraction grating element and a first photodetector used in the first preferred embodiment.

In this first preferred embodiment, the birefringent diffraction grating element 50 and the first photodetector 56 are arranged to have a relation shown in FIG. 6. As clearly illustrated therein, the birefringent diffraction grating element 50 has first to fourth grating pattern sections 59 to 62, and the first photodetector 56 has first to sixth segments 63 to 68, on which four light spot points A to D are indicated. On the first grating pattern section 59, a grating pattern is defined to provide a light spot focused on the point A by a light incident to the section 59. In the same manner, grating patterns are defined on the second to fourth grating pattern sections 60 to 62 to provide light spots focused on the points B to D by lights incident to the sections 60 to 62, respectively. In this arrangement, a focus error signal is obtained by a subtraction between two sums of output signals of diagonal segments among the central segments 63 to 66 of the first photodetector 56, while a track error signal is obtained by a subtraction between output signals of the fifth and sixth segments 67 and 68 thereof. In this first preferred embodiment, although the grating patterns of the birefringent diffraction grating element 50 are arranged to provide the plus and minus primary diffraction lights 55 and 57 to the left and right of the semiconductor laser 48, the plus and minus primary diffraction lights 55 and 57 may be directed on the upper and lower sides of the semiconductor laser 48, because a relation between grating patterns of a birefringent diffraction grating element and a crystal axis of a lithium niobate crystal is arbitrary.

Here, the birefringent diffraction grating element 50 will be explained in more detail.

If proton-exchange is applied to X-plate or Y-plate of lithium niobate by benzoic acid, refractive indexes are increased relative to an extraordinary light by approximately 0.13, and decreased relative to an ordinary light by approximately 0.04. Then, it is possible that an refractive index change occurs relatively only to an extraordinary light due to proton-exchange, in a state that a phase difference occurring between ordinary lights transmitting through a proton-exchange section and a proton-non-exchange section is cancelled by means of a phase compensation film, etc. Therefore, when the proton-exchange and non-exchange sections are provided periodically, and a phase difference compensation measure such as the aforementioned film is adopted, a diffraction grating operating to diffract only an extraordinary light is obtained. In this circumstance, if a phase difference of the extraordinary light is set to be "π" between the proton-exchange section and the proton-non-exchange section, a transmission factor of the extraordinary light is 0%, while that of the ordinary light is 100%. A polarizer has been discussed to be applied to such a birefringent diffraction grating, as described on pages 168 and 169 of "a technical digest" in "the second optoelectronics conference (OEC '88)".

This grating element has a function of a polarizer, and can be applied to an optical head of a read only type, a write-once type, or a phase-change type, as understood from a following explanation.

Figure 7:
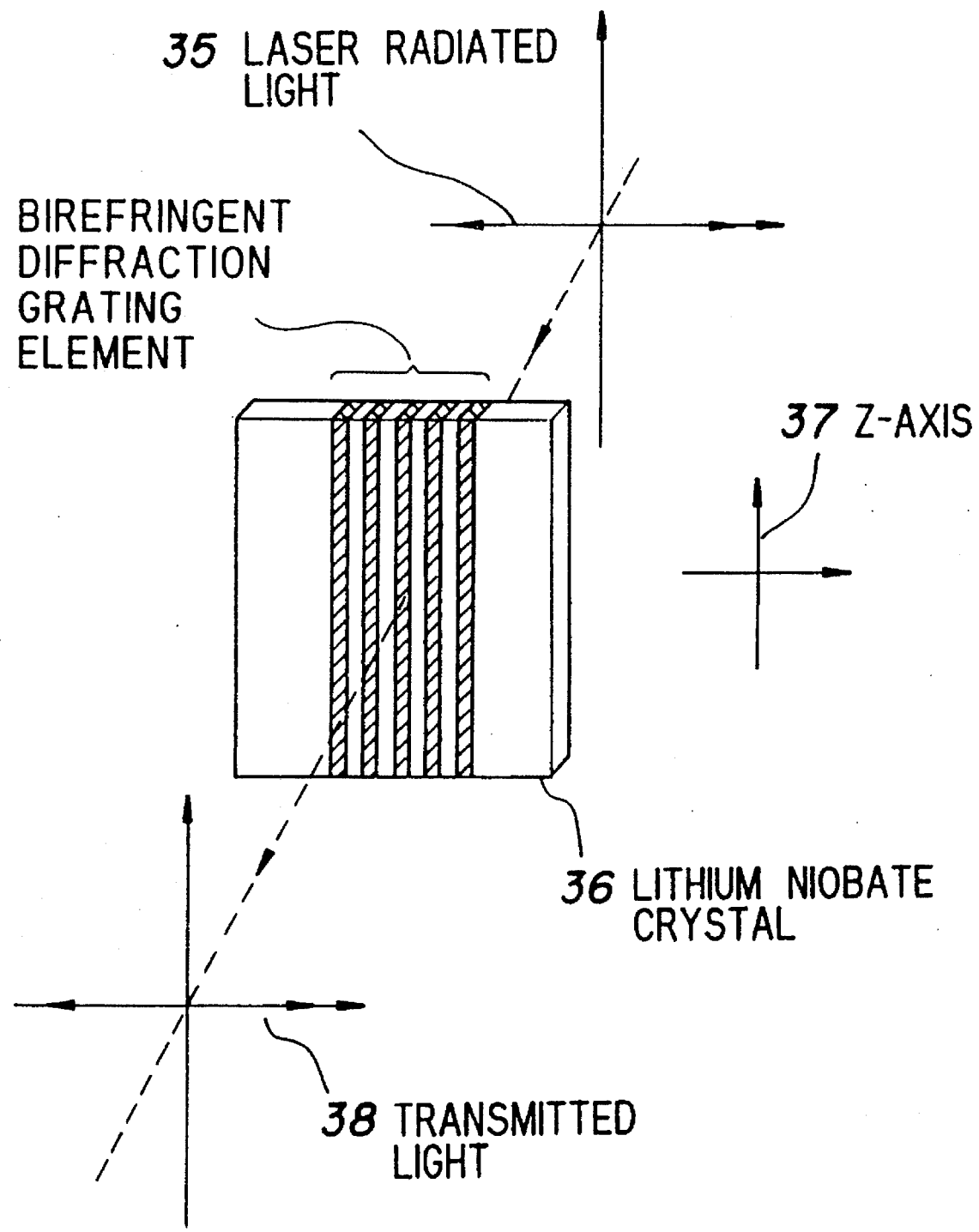
FIGS. 7 and 8 are explanatory diagrams showing operation and principle of the birefringent diffraction grating element used in the first preferred embodiment.
Figure 8:
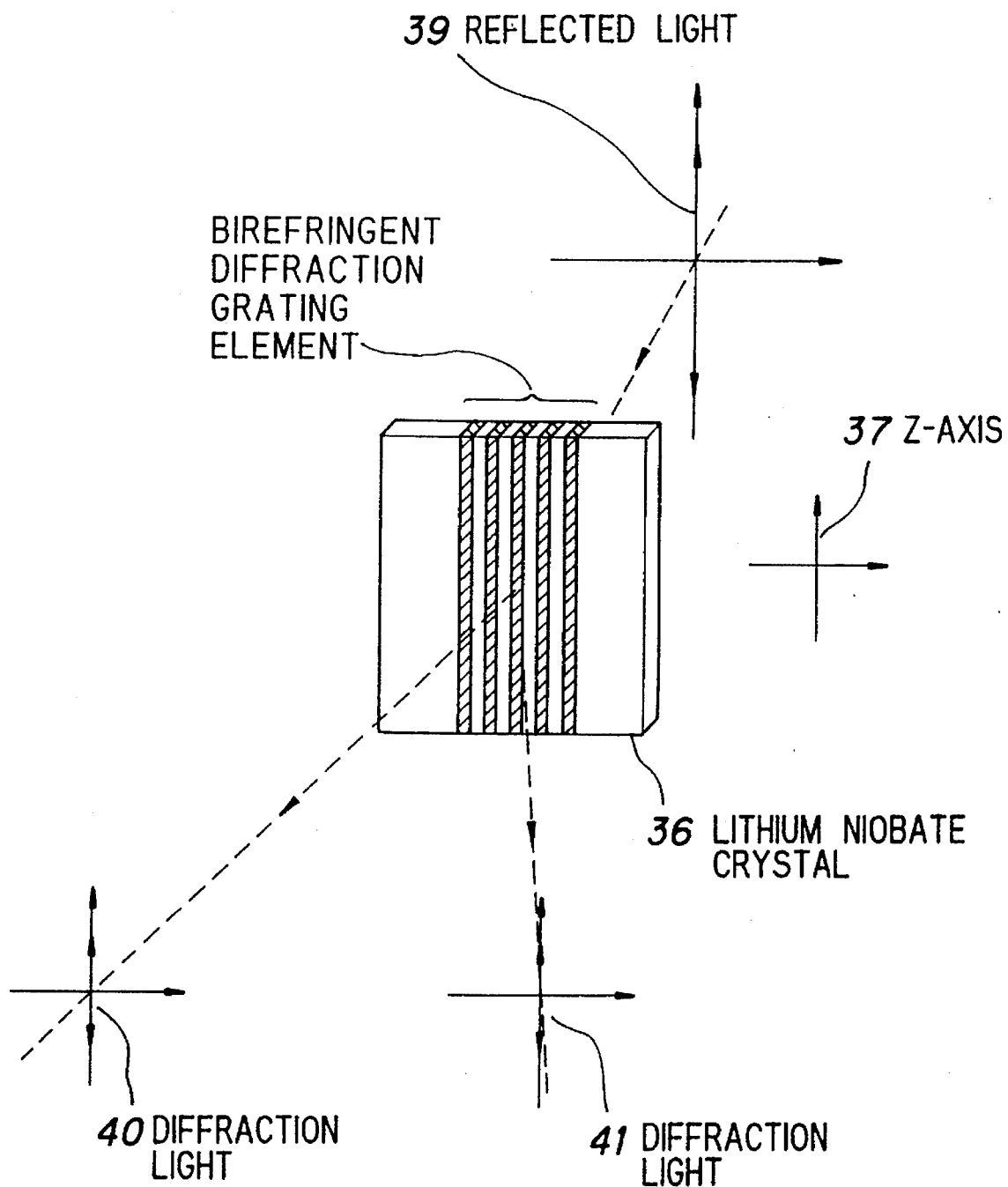

In FIG. 7, it is arranged that Z-axis of the lithium niobate crystal 36 is orthogonal to a linear polarization 35 of the light radiated from the semiconductor laser 48 in the first preferred embodiment. Therefore, the radiated light is not affected by the grating pattern of the lithium niobate crystal 36. As shown in FIG. 8, on the other hand, a linear polarization 39 of the light reflected from the optical disc 54 is rotated to be supplied to the lithium niobate crystal 36 relative to the linear polarization 35 of the radiated light by 90 degrees, because the radiated light is transmitted through the quarter wave plate 52 two times. As a result, the supplied light is diffracted in its almost all light amount to be diffracted lights 40 and 41 by the lithium niobate crystal 36. Therefore, almost all the radiated light is not returned to the semiconductor laser 48. Consequently, the semiconductor laser 48 can continue a stable lasing oscillation in a state that it does not have returning light noise, so that a quality of reproduced information is not deteriorated. Even more, at least two diffraction lights are received to improve the quality by the photodetectors which can compensate the decrease of light amount.

Figure 9:
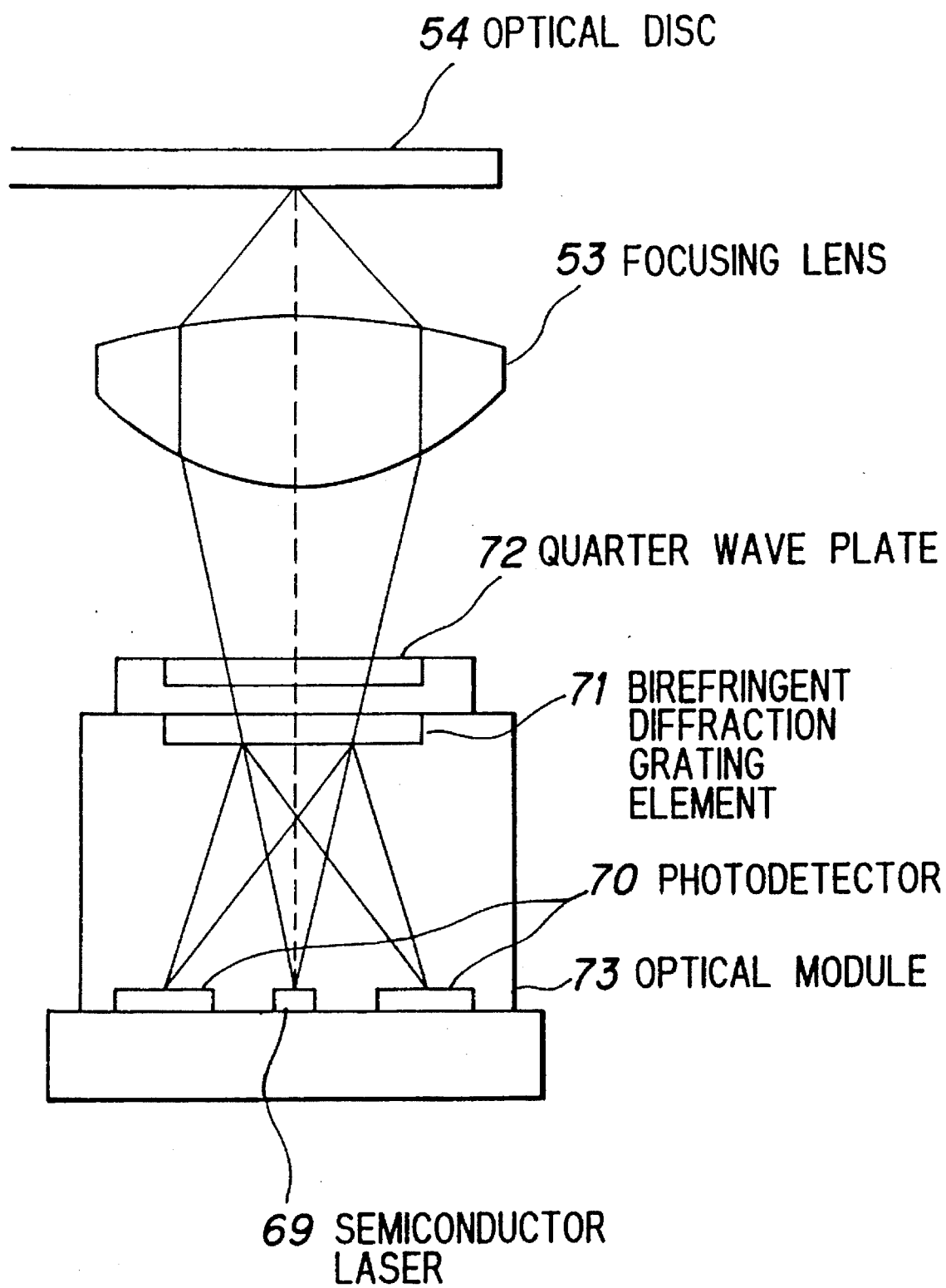
FIG. 9 is an explanatory diagram showing an optical head in a second preferred embodiment according to the invention.

FIG. 9 shows an optical head in the second preferred embodiment according to the invention. The optical head comprises a semiconductor laser 69, photodetectors 70, and a birefringent diffraction grating element 71 and a quarter wave plate 72 which are included integrally in an optical module 73. The optical head further comprises a focusing lens 53, and an optical disc 54. This optical head can be compact, because the optical module 73 is utilized. Operation of this optical head is almost identical to that of the optical head in the first preferred embodiment. Therefore, the explanation thereof is not made here.

Figure 10:
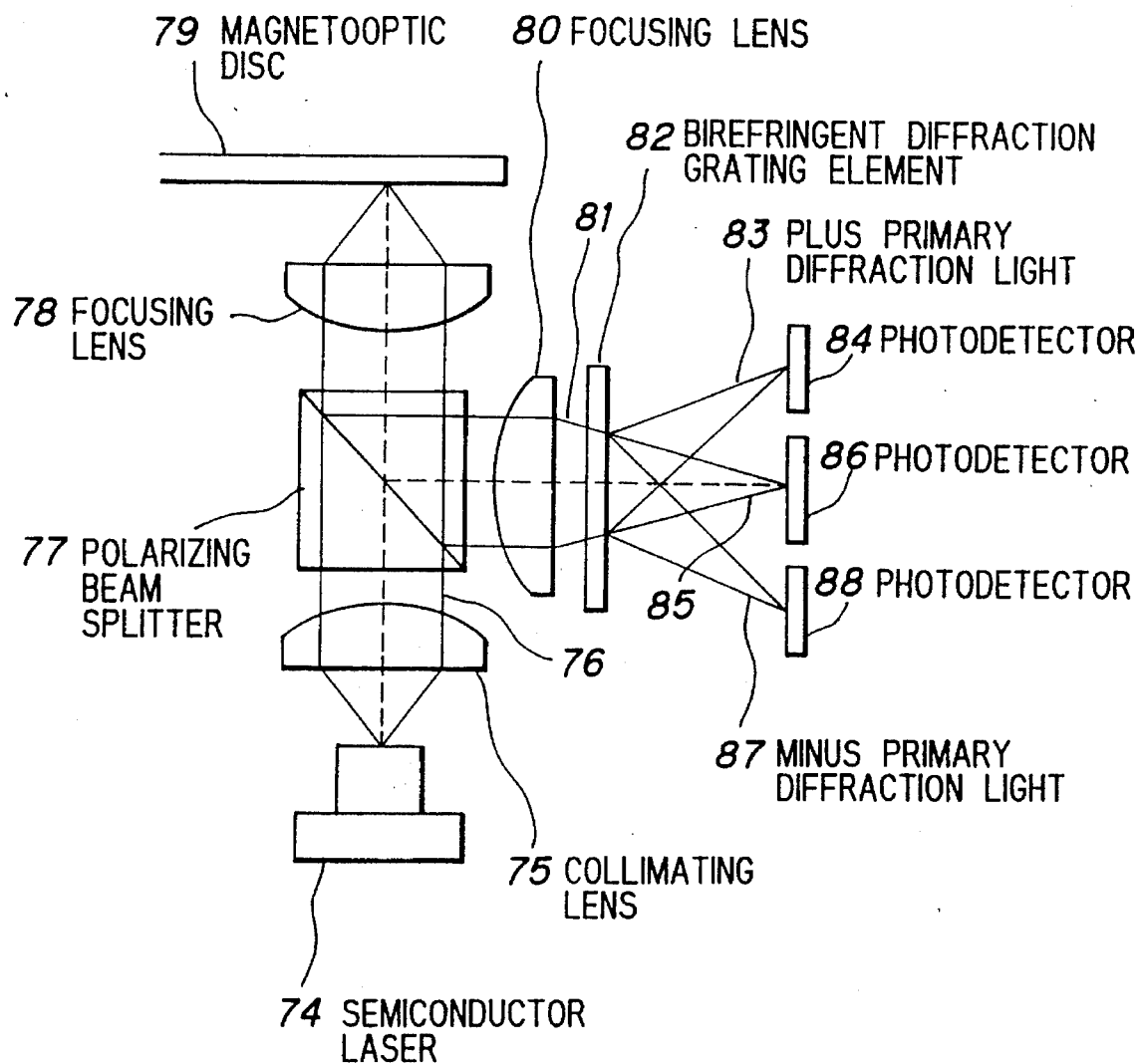
FIG. 10 is an explanatory diagram showing an optical head in a third preferred embodiment according to the invention.

FIG. 10 shows an optical head in the third preferred embodiment according to the invention. The optical head comprises a semiconductor laser 74, a collimating lens 75, a polarizing beam splitter 77, a focusing lens 78, a magnetooptic disc 79, a focusing lens 80, a birefringent diffraction grating element 82, and first to third photodetectors 84, 86 and 88.

In this optical head, a light radiated from the semiconductor laser 74 is converted to a parallel light 76 by the collimating lens 75, and the parallel light 76 is transmitted through the polarizing beam splitter 77 to be focused on the magnetooptic disc 79 by the focusing lens 78. A light reflected from the magnetooptic disc 79 is converted to a parallel light by the focusing lens 78, and the parallel light is supplied to the polarizing beam splitter 77, and is thereby introduced to a signal detecting system, in which a light supplied from the polarizing beam splitter 77 is focused to be supplied to the birefringent diffraction grating element 82 composed of a lithium niobate crystal by the focusing lens 80. The Z-axis of this crystal has 45 degrees in its arrangement relative to a main polarization direction of the reflected light. A plus primary diffraction light 83, a transmitted light 85, and a minus primary light 87 are supplied from the birefringent diffraction grating element 82 to the first to third photodetectors 84, 86 and 88, respectively, as illustrated in FIG. 10. Consequently, information stored in the magnetooptic disc 79 is re-produced by a difference signal between an output signal of the second photodetector 86 and a sum signal of output signals of the first and second photodetectors 84 and 88.

In a modified arrangement of the third preferred embodiment according to the invention, the Z-axis of the lithium niobate crystal has 46.5 degrees relative to the main polarization direction of the reflected light from the magnetooptic disc 79. A grating pattern of the birefringent diffraction grating element 82 is obtained by the proton-exchange, as explained before, and has a cross-section of a rectangle. When a grating pattern is provided to have a depth of grooves, such that a transmission factor of an extraordinary light is 0%, a diffraction efficiency of plus and minus primary diffraction lights is approximately 4.0%. As a result, a light receiving diffraction efficiency is approximately 80%. According to a definition to be explained later, a light intensity ratio $\gamma$ of a receiving diffraction light is 0.8. Consequently, a crystal angle $\alpha$ of the lithium niobate crystal relative to an incident linearly polarized light can be set to be an angle between 45 and 48 degrees, as shown in FIG. 3 to be explained later. In the modified preferred embodiment, the angles is set to be 46.5 degrees.

Figure 11:
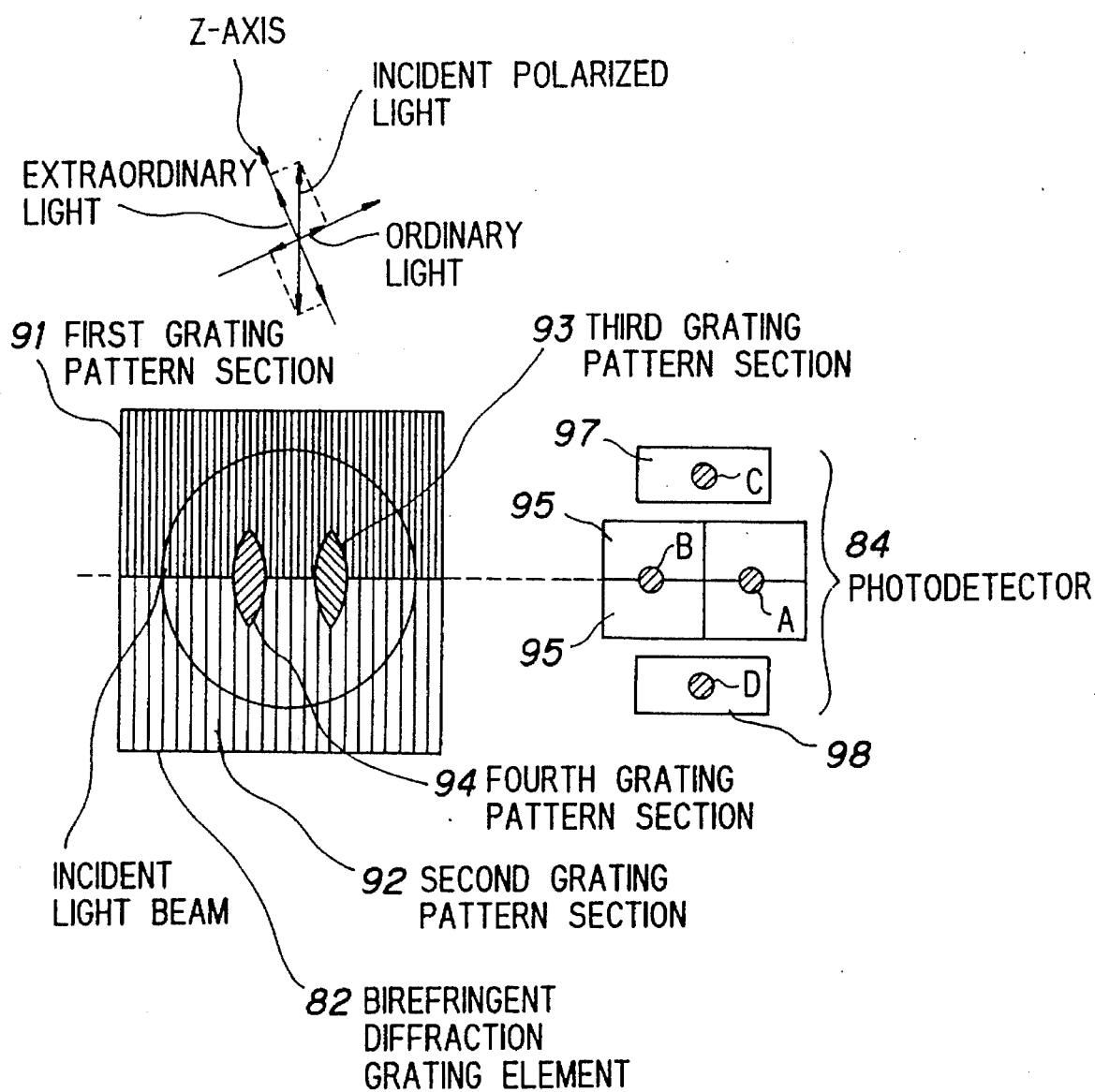
FIG. 11 is an explanatory diagram showing a relation between a birefringent diffraction grating element and a first photodetector used in the third preferred embodiment.

FIG. 11 shows a relation between grating pattern sections of the birefringent diffraction grating element 82 and divided segments of the first photodetector 84. The birefringent diffraction grating element 82 is provided with first to fourth grating pattern sections 91 to 94, and the first photodetector is provided with first to fourth segments of 95, fifth segment 97 and sixth segment 98, on which light spots A to D are formed. When a light spot is adequately formed on the magnetooptic disc 79, a light incident to the first grating pattern section 91 of the birefringent diffraction grating element 82 is focused to be the light spot A on the first photodetector 84. In the same manner, grating patterns are defined on the second to fourth grating pattern sections 92 to 94, such that lights incident to those sections 92 to 94 are focused to be the light spots B to D on the first photodetector 84. In this arrangement, a focus error signal is obtained by a difference signal between a first output sum of first diagonal segments and a second output sum of second diagonal segments, respectively, of the four segments 95 in the first photodetector 84, and a track error signal is obtained by a difference signal between output signals of the fifth and sixth segments 97 and 98 in the first photodetector 84.

Here, a function of the birefringent diffraction grating element 82 relative to the magnetooptic disc 79 will be explained in more detail in FIGS. 12 to 14.

Figure 12:
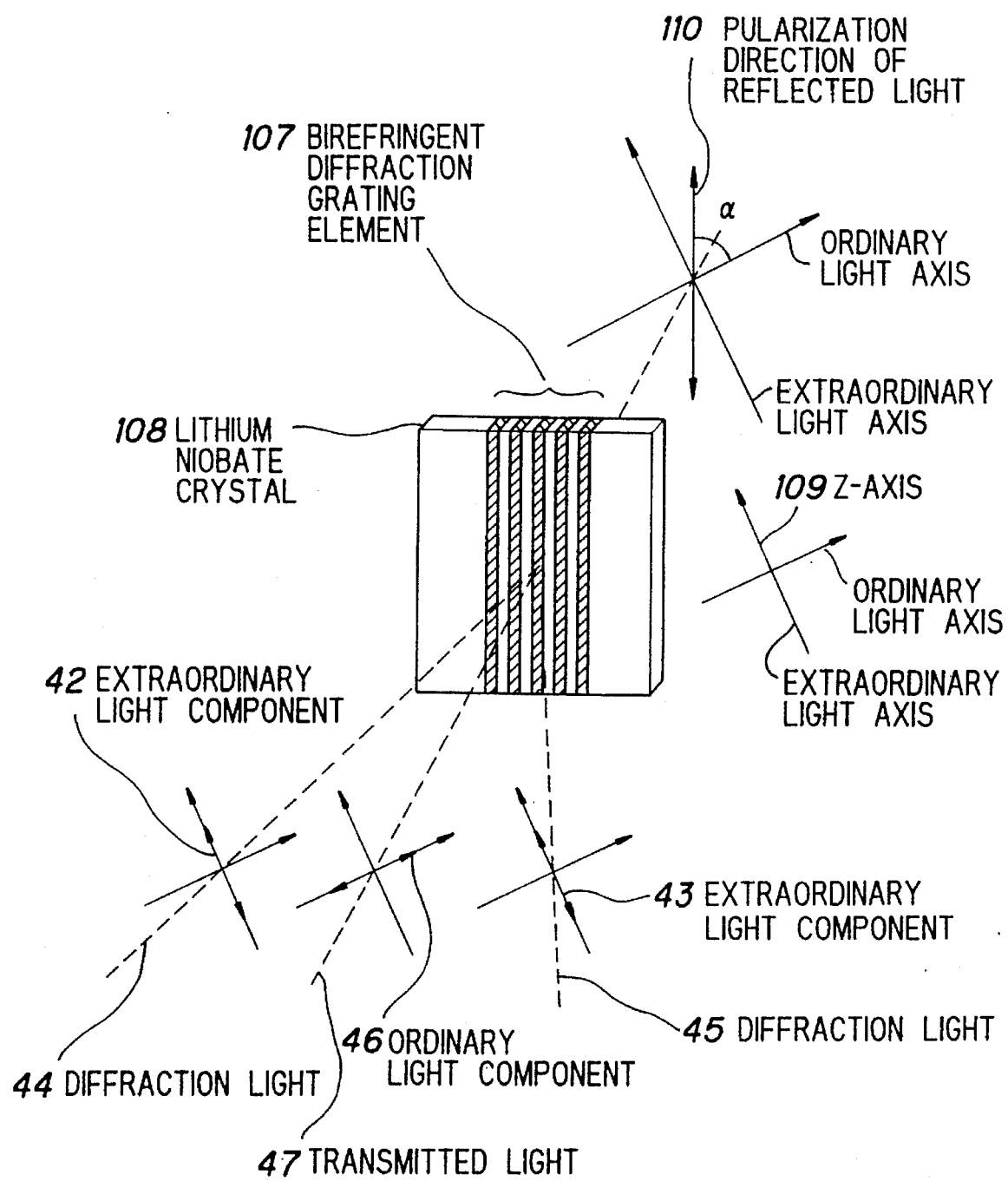
FIG. 12 is an explanatory diagram showing operation and principle of the birefringent diffraction grating element used in the third preferred embodiment.

FIG. 12 shows a relation in which a main polarization direction 110 of a light reflected from the magnetooptic disc 79 is approximately 45 degrees relative to the Z-axis 109 of the lithium niobate crystal for the birefringent diffraction grating element 82 fabricated as explained before. Consequently, extraordinary light components 42 and 43 of the reflected light are divided to be diffraction lights 44 and 45, while an ordinary component 41 thereof is transmitted through the birefringent diffraction grating element 82 to be a transmitted light 47. As explained before, information stored in the magnetooptic disc 79 is re-produced by a difference signal between a summed light intensity of the diffraction lights 44 and 45 and a light intensity of the transmitted light 47.

Otherwise, the main polarization direction 110 of the reflected light from the magnetooptic disc 79 may be changed at any angle other than 0 and 90 degrees relative to the Z-axis of the lithium niobate crystal 108 for the birefringent diffraction grating element 107. Even in such an arrangement, the same result that the extraordinary light components 42 and 43, and the ordinary light component 46 are divided in the form of the diffraction lights 44 and 45, and the transmitted light 47 is obtained. In this circumstance, a light intensity ratio is determined by a crystal angle$^\alpha$ of the crystal relative to a polarization direction of the incident linearly polarized light, a diffraction efficiency $\eta$, and an order number n of receiving diffraction lights, where the order number n is an integer including "one". That is, it may includes plus and minus diffraction lights, and, even more, secondary diffraction light. For the purpose of removing same phase noise components in a signal detection, it is desired that direct current components of the diffraction and transmission lights are equal in light amount to each other. In this point, when the diffraction efficiency $\eta$, and the order number n of the receiving diffraction lights are specified, the aforementioned angle$^\alpha$ is determined to make the direct current components equal to each other.

Figure 13:
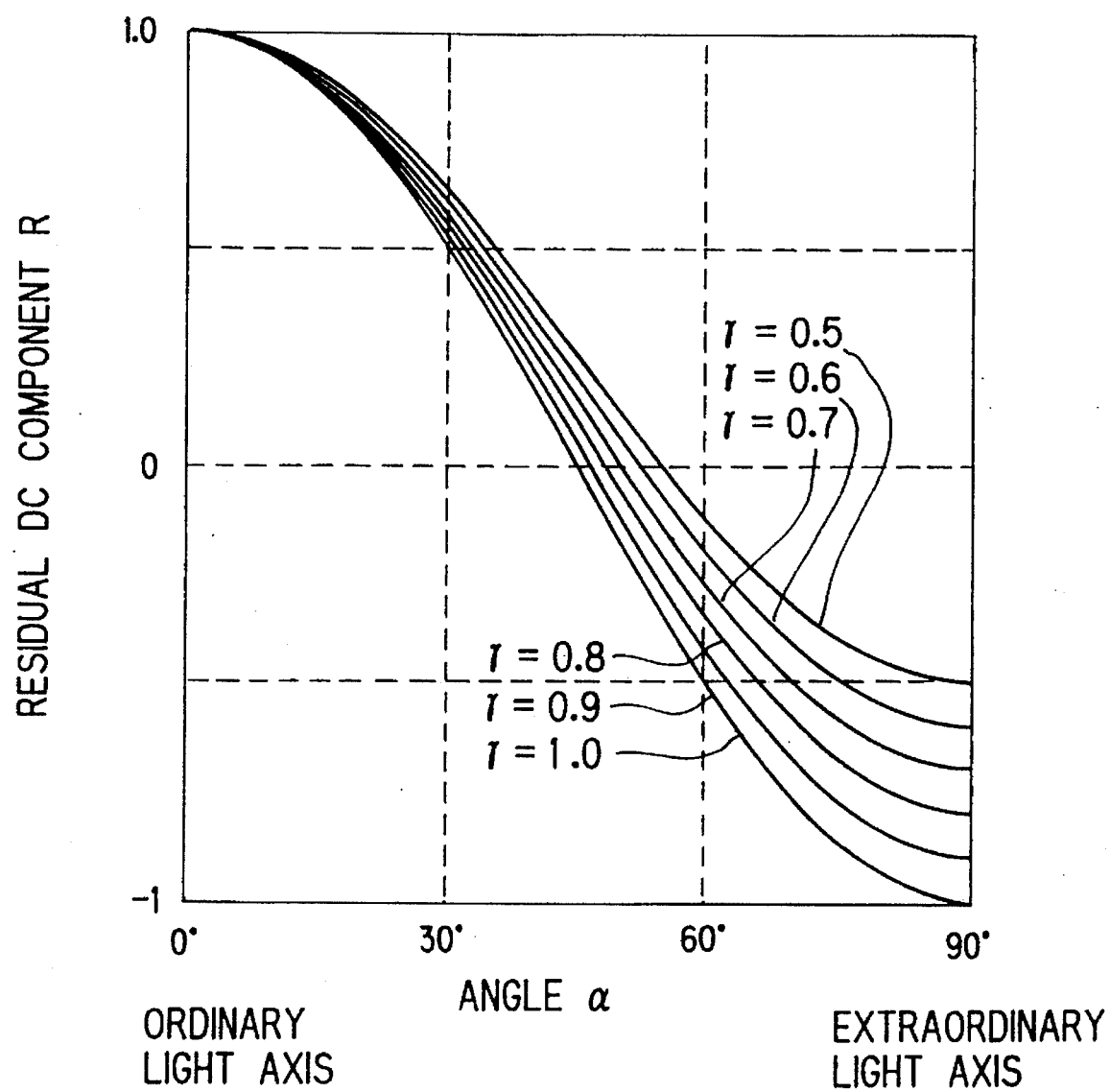
FIG. 13 is a graph showing a relation between a residual direct current component and a crystal angle of a lithium niobate crystal relative to an incident linearly polarized light in the third preferred embodiment.

FIG. 13 shows a dependency of a residual direct current component R on a relative angle$^\alpha$ of the crystal axis to a polarization direction of an incident linearly polarized light by use of a parameter of the diffraction light intensity ratio $\gamma$ after a signal detection normalized by a light intensity of the transmission light. As apparent from the explanation of FIG. 12, when the angle $\alpha$ is 0°, the polarization direction of the incident linearly polarized light is coincided with an ordinary light axis of the crystal, while, when the angle $\alpha$ is 90°, the polarization direction is coincided with an extraordinary light axis thereof. Although the residual direct current component R is zero in a curve having a diffraction light intensity ratio $\gamma$ of "1", when the angle $\alpha$ is 45 degrees, the value of the diffraction light intensity ratio $\gamma$ is not practical. The diffraction light intensity ratio $\gamma$ is practically less than "1". As the diffraction light intensity ratio $\gamma$ is decreased, the angle $\alpha$, at which the residual direct current component R becomes zero, is increased.

Figure 14:
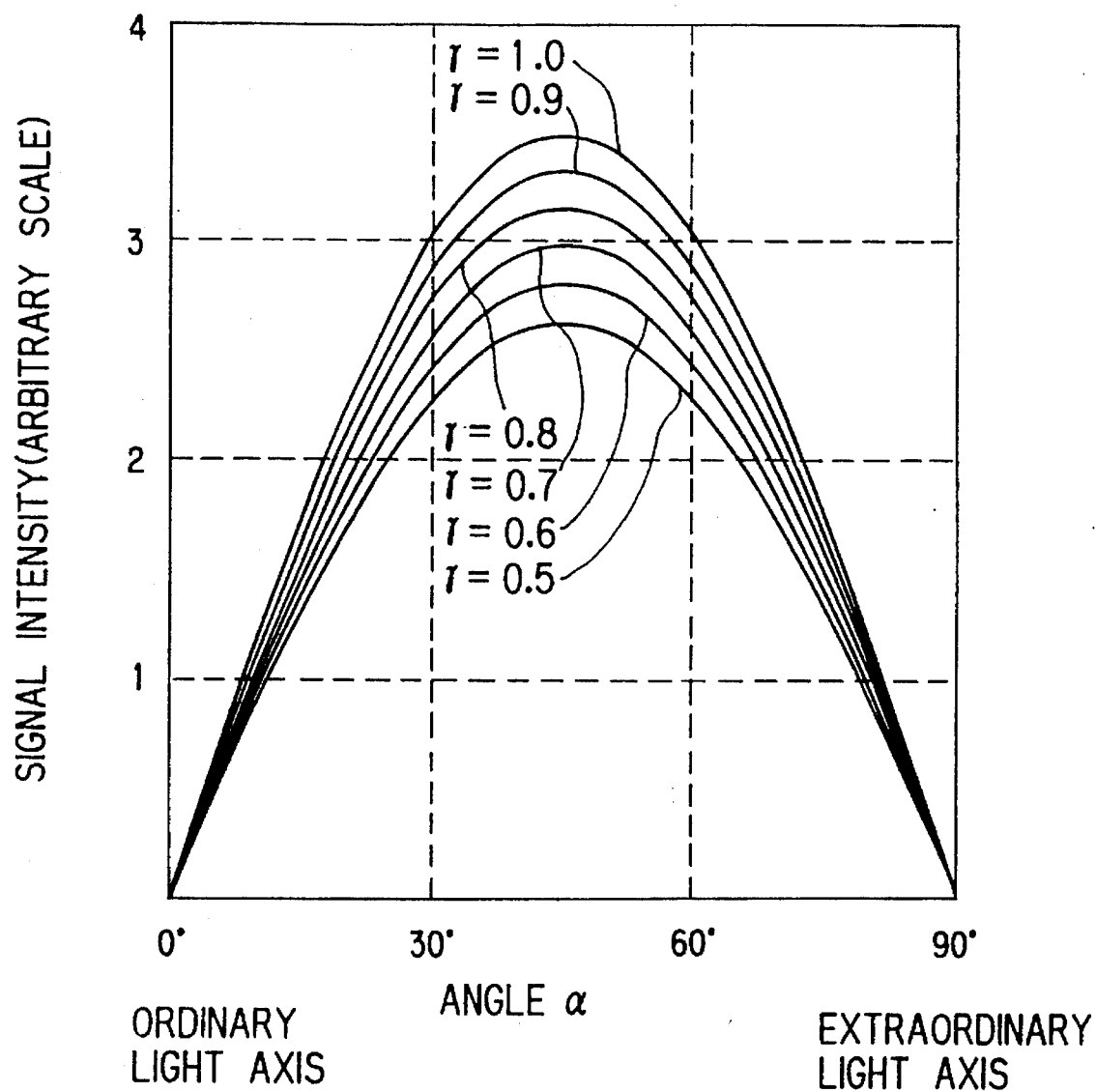
FIG. 14 is an explanatory diagram showing a relation between a signal intensity and the crystal angle in the third preferred embodiment.

On the other hand, FIG. 14 shows a calculation result how a magnetooptic signal is dependent on the relative angle $\alpha$. As clearly seen therein, the magnetooptic signal is maximum, when the relative angle is 45 degrees, regardless of a value of the diffraction light intensity ratio $\gamma$.

Therefore, if it is designed that the relative angle$_\alpha$ is set to be 45 degrees, at which direct current components of the diffraction and transmission lights are equal in light amount to each other, a signal/noise ratio can be maximum. In addition, if a grating pattern provided on the lithium niobate crystal becomes in the form of a hologram, focus and track errors can be detected by receiving the diffraction lights.

Figure 15:
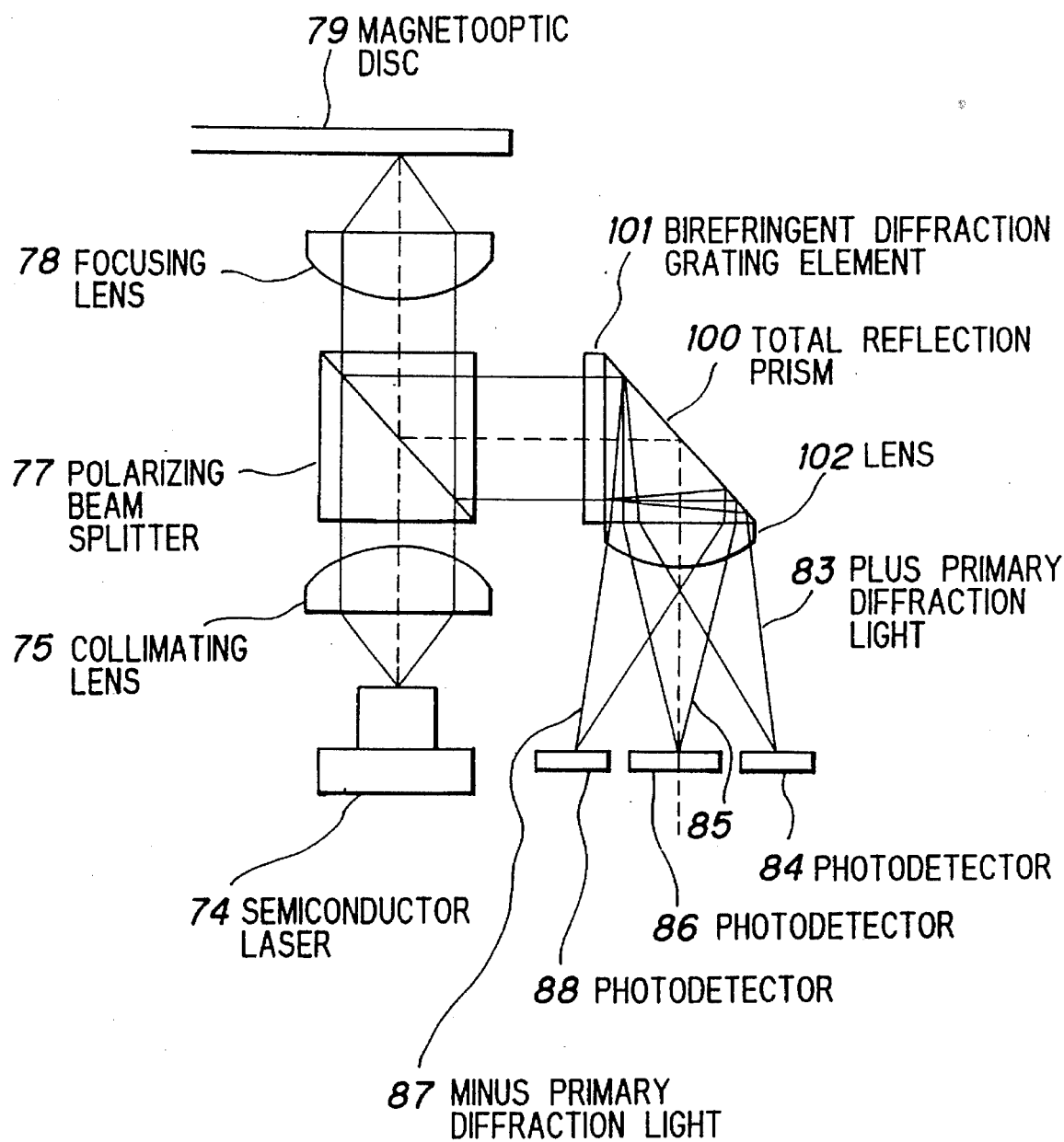
FIGS. 15 and 16 are explanatory diagrams showing optical heads in fourth and fifth preferred embodiments according to the invention.

FIG. 15 shows an optical head in the fourth preferred embodiment according to the invention. The optical head comprises a semiconductor laser 74, a collimating lens 75, a polarizing beam splitter 77, a focusing lens 78, a magnetooptic disc 79, first to third photodetectors 84, 86 and 88, a total reflection prism 100, a birefringent diffraction grating element 101, and a focusing lens 102. In this arrangement, the total reflection prism 100, the birefringent diffraction grating element 101, and the focusing lens 102 are integrally combined to provide a single optical package. As a result, the optical head becomes small and compact. In this optical package, the birefringent diffraction grating element 101 is bonded to the total reflection prism 100 by use of adhesives, while the focusing lens 102 is combined to the total reflection prism 100 by polishing both contacting surfaces thereof or by use of adhesives.

In operation, plus and minus primary diffraction lights 83 and 87 are received by the first and third photodetectors 84 and 88, and transmission light 85 is received by the second photodetectors 86, as explained in the preferred embodiment of FIG. 10.

Figure 16:
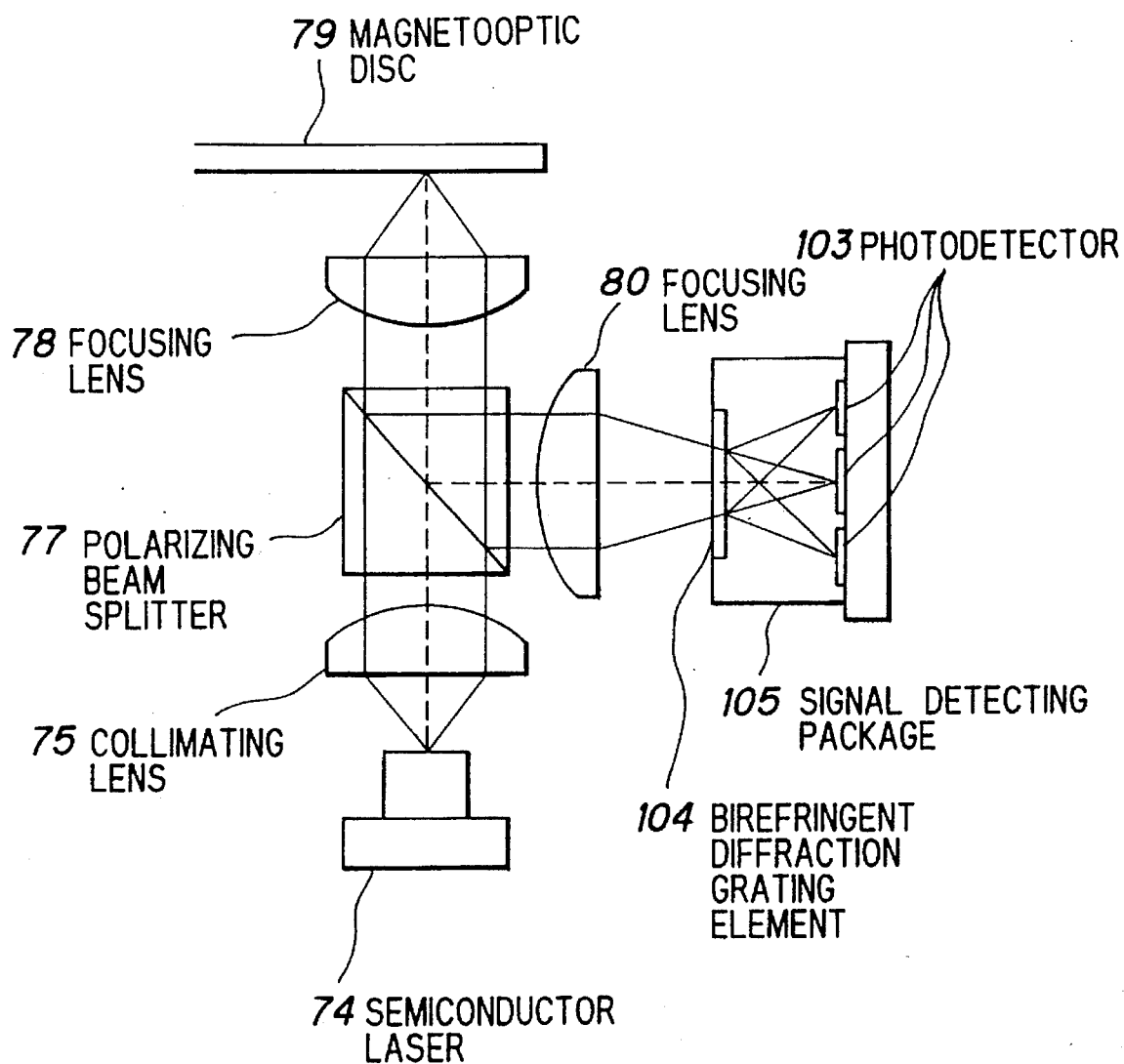

FIG. 16 shows an optical head in the fifth preferred embodiment according to the invention. The optical head comprises a semiconductor laser 74, a collimating lens 75, a polarizing beam splitter 77, a focusing lens 78, a magnetooptic disc 79, a focusing lens 80, and a signal detecting package 105 including a birefringent diffraction grating element 104 and photodetectors 103. The signal detecting package 105 may include the focusing lens 80. By the adoption of the signal detecting package 105, the optical head can be compact.

The aforementioned birefringent grating elements can be fabricated by a planar batch process. For instance, Ti-diffused layer is formed on a Y-plate lithium niobate substrate, and proton-exchange is carried out in the Ti-diffused layer by a predetermined grating pattern.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An optical head, comprising:

means for focusing a light radiated from a light source on an optical disc;

an optical diffraction element for diffracting a light reflected from said optical disc; and a photodetector device for detecting a light diffracted by said optical diffraction element;

wherein said optical diffraction element is a birefringent diffraction grating element which includes a lithium niobate crystal on which proton-exchange and proton-nonexchange sections are provided, and a phase compensation film to cancel a phase difference of ordinary light transmitted through said proton-exchange and proton-nonexchange sections to cause diffraction of only extraordinary light, and further wherein:

said birefringent diffraction grating element is arranged, such that an optic axis of said optical crystal is substantially orthogonal to a polarization direction of a polarized light radiated from said light source; and said photodetector device includes a photodetector for receiving a plus primary diffraction light supplied from said birefringent diffraction grating element, and another photodetector for receiving a minus primary diffraction light supplied from said birefringent diffraction grating element.

2. An optical head, according to claim 1, further comprising:

a quarter wave plate for converting said light reflected from said optical disc to a linearly polarized light orthogonal to said light radiated from said light source.

3. An optical head, comprising:

means for focusing a light radiated from a light source on an optical disc;

an optical diffraction element for diffracting a light reflected from said optical disc; and a photodetector device for detecting a light diffracted by said optical diffraction element; wherein said optical diffraction element is a birefringent diffraction grating element having plural sections of different grating patterns and utilizing an optical crystal;

said optical disc is of a magnetooptic recording medium; and said optical diffraction element is arranged, such that an optical axis of said optical crystal is slanted by approximately 45 degrees relative to a main polarization direction of a light reflected from said optical disc of said magnetooptic recording medium.

4. An optical head, comprising:

means for focusing a light radiated from a light source on an optical disc;

an optical diffraction element for diffracting a light reflected from said optical disc; and a photodetector device for detecting a light diffracted by said optical diffraction element; wherein said optical diffraction element is a birefringent diffraction grating element having plural sections of different grating patterns and utilizing an optical crystal;

said optical disc is of a magnetooptic recording medium; and said optical diffraction element is arranged, such that an angle between an optical axis of said optical crystal and a main polarization direction of a light reflected from said optical disc of said magnetooptic recording medium is in a range between an angle, at which an output signal of a photodetector for receiving a zero-order diffraction light of said diffracted light and a summed output signal of photodetectors for receiving primary or more diffraction lights are equal to each other, and 45 degrees.

5. An optical head, comprising:

means for focusing a light radiated from a light source on an optical disc;

an optical diffraction element for diffracting a light reflected from said optical disc; and a photodetector device for detecting a light diffracted by said optical diffraction element;

wherein said optical diffraction element is a birefringent diffraction grating element having plural sections of different grating patterns and utilizing an optical crystal, and further wherein said light source, said photodetector device and said birefringent diffraction grating element are disposed integrally so as to form an optical module.

6. An optical head, comprising:

a light source for radiating a first linearly polarized light;

a lens system for propagating said first linearly polarized light in a first direction and focusing said first linearly polarized light on an optical disc which stores information, said lens system propagating a reflected light from said optical disc in a second direction opposite to said first direction;

a polarization plate for providing a second linearly polarized light having a polarization orthogonal to a polarization of said first linearly polarized light by receiving said reflected light;

a birefringent diffraction grating element comprising a lithium niobate crystal including plural regions each having a different grating pattern, said birefringent diffraction grating element transmitting said first linearly polarized light, which is an ordinary light relative thereto, to said lens system, and providing plus and minus primary diffraction lights by receiving said second linearly polarized light which is an extraordinary light thereto;

a first photodetector having plural regions for receiving said plus primary diffraction light, said plus primary diffraction light being focused on said plural regions of said first photodetector in the form of plural light spots defined by said plural regions of said birefringent diffraction grating element to thereby detect focusing and tracking errors; and a second photodetector for receiving said minus primary diffraction light to be focused thereon to detect said information by receiving output signals of said first photodetector.

7. An optical head according to claim 6, wherein said birefringent diffraction grating element comprises four regions, and said first photodetector comprises six regions.

8. An optical head according to claim 6, wherein said light source, said first and second photodetectors and said birefringent diffraction grating element are disposed integrally so as to form an optical module.

9. An optical head according to claim 6, wherein said lens system, said polarization plate, and said birefringent diffraction grating element are positioned on a linear light path defined between said light source and said optical disc; and said first and second photodetectors are respectively positioned on opposite sides of said light source.

10. An optical head according to claim 9, wherein said light source, said birefringent diffraction grating element, and said first and second photodetectors are integral in structure to provide an optical module, such that said birefringent diffraction grating element comprises an optical window of said optical module for said first and second linearly polarized lights.

11. An optical head, comprising:

a light source for radiating a first light;

a lens system for propagating said first light in a first direction and focusing said first light on a magnetooptic disc which stores information, said lens system propagating a reflected light from said magnetooptic disc in a second direction opposite to said first direction;

a polarizing beam splitter which receives said reflected light and supplies a second light;

a birefringent diffraction grating element comprising a lithium niobate crystal including plural regions each having a different grating pattern, said birefringent diffraction grating element receiving said second light and supplying a plus primary diffraction light, a transmitted light, and a minus primary diffraction light;

a first photodetector having plural regions for receiving said plus primary diffraction light, said plus primary diffraction light being focused on said plural regions of said first photodetector in the form of plural light spots defined by said plural regions of said birefringent diffraction grating element to thereby detect focusing and tracking errors;

a second photodetector for receiving said transmitted light; and a third photodetector for receiving said minus primary diffraction light.

12. An optical head according to claim 11, wherein said birefringent diffraction grating element comprises four regions, and said first photodetector comprises six regions.

13. An optical head, comprising:

a light source for radiating a first light;

a lens system for propagating said first light in a first direction and focusing said first light on a magnetooptic disc which stores information, said lens system propagating a reflected light from said magnetooptic disc in a second direction opposite to said first direction;

a polarizing beam splitter which receives said reflected light and supplies a second light;

a birefringent diffraction grating element comprising a lithium niobate crystal including plural regions each having a different grating pattern, said birefringent diffraction grating element receiving said second light and supplying a plus primary diffraction light, a transmitted light, and a minus primary diffraction light;

a total reflection prism bonded together with said birefringent diffraction grating element;

a first photodetector having plural regions for receiving said plus primary diffraction light, said plus primary diffraction light being focused on said plural regions of said first photodetector in the form of plural light spots defined by said plural regions of said birefringent diffraction grating element to thereby detect focusing and tracking errors;

a second photodetector for receiving said transmitted light; and a third photodetector for receiving said minus primary diffraction light.

14. An optical head, comprising:

a light source for radiating a first light;

a lens systems for propagating said first light in a first direction and focusing said first light on a magnetooptic disc which stores information, said lens system propagating a reflected light from said magnetooptic disc in a second direction opposite to said first direction;

a polarizing beam splitter which receives said reflected light and supplies a second light;

a birefringent diffraction grating element comprising a lithium niobate crystal including plural regions each having a different grating pattern, said birefringent diffraction grating element receiving said second light and supplying a plus primary diffraction light, a transmitted light, and a minus primary diffraction light;

a first photodetector having plural regions for receiving said plus primary diffraction light, said plus primary diffraction light being focused on said plural regions of said first photodetector in the form of plural light spots defined by said plural regions of said birefringent diffraction grating element to thereby detect focusing and tracking errors;

a second photodetector for receiving said transmitted light; and a third photodetector for receiving said minus primary diffraction light, wherein said birefringent diffraction grating element and said first, second and third photodetectors are disposed integrally so as to form a signal detecting package.

* * * * *

UNITED STATES PATENT AND TRADEMARK OFFICE
CERTIFICATE OF CORRECTION

PATENT NO. : 5,493,555
DATED : February 20, 1996
INVENTOR(S) : Yasuo Kimura, et al.

It is certified that error appears in the above-indentified patent and that said Letters Patent is hereby corrected as shown below:

Column 7, line 17, delete "4.0%" and insert --40%--.

Column 7, line 25, delete "angles" and insert --angle a--.

Column 8, line 8, delete "angle$^\alpha$" and insert --angle $\alpha$--.

Column 8, line 19, delete "angle$^\alpha$" and insert --angle $\alpha$--.

Column 8, line 22, delete "angle$^\alpha$" and insert --angle $\alpha$--.

Column 8, line 45, delete "angle$_\alpha$" and insert --angle $\alpha$--.

Signed and Sealed this

Ninth Day of July, 1996

Attest:

BRUCE LEHMAN

*Attesting Officer*    *Commissioner of Patents and Trademarks*